United States Patent [19]

Rainbolt

[11] 4,043,433
[45] Aug. 23, 1977

[54] CALIPER BRAKE SLIDER SUPPORT

[75] Inventor: Jack D. Rainbolt, Troy, Ohio

[73] Assignee: The B. F. Goodrich Company, Akron, Ohio

[21] Appl. No.: 722,985

[22] Filed: Sept. 13, 1976

[51] Int. Cl.² .......................................... F16D 55/224
[52] U.S. Cl. .............................. 188/73.4; 108/206 R
[58] Field of Search ........................... 188/73.3–73.5, 188/206 R

[56] References Cited

U.S. PATENT DOCUMENTS

| 3,330,385 | 7/1967 | Swift | 188/73.4 |
| 3,710,896 | 1/1973 | Machek | 188/73.4 |

FOREIGN PATENT DOCUMENTS 1,015,083  12/1965  United Kingdom ................ 188/73.4

Primary Examiner—Duane A. Reger
Attorney, Agent, or Firm—W. A. Shira, Jr.; F. K. Lacher

[57] ABSTRACT

A U-shaped brake slider support for the floating caliper and friction lining carriers having parallel rail members on which the caliper and carriers slide and a tie bar connecting the rail members. The tie bar is a plate member with end flanges for fastening to the rail members. The plate member may include a reinforcing flange and have recesses to provide clearance for other brake parts. The plate member may also have openings through which ends of the rail members extend.

6 Claims, 5 Drawing Figures

Fig. 2

CALIPER BRAKE SLIDER SUPPORT

BACKGROUND OF THE INVENTION

Heretofore floating caliper disc brakes have included a U-shaped glider support with a pair of rails connected by a connecting member. When the connecting member was in the same plane as the rail members it required substantial space around the end of the caliper which unduly limited the disc diameter and the amount of caliper penetration into the wheel envelope. When the connecting member was located between the outboard caliper leg and the disc adapter greater caliper penetration and disc diameters were possible; however, the connecting member was of such a shape and located in such a position that a substantially thick member was required to provide the necessary strength. This increased the weight and cost of manufacturing the brake assembly.

SUMMARY OF THE INVENTION

The present invention provides a slider support construction in which the desired caliper wheel well penetration and disc diameter are obtainable with a minimum weight and cost of manufacture. This is accomplished with a fabricated construction in which the connecting tie bar is a plate member having a thickness and configuration for maximum strength while at the same time fitting in the space available around the end of the outboard leg of the caliper. This construction also provides a force damping effect through the rail members. Included in the tie bar plate member configuration is a reinforcing flange and openings for the ends of the rail members as well as end flanges for attachment to the rail members.

BRIEF DESCRIPTION OF THE DRAWINGS

FIG. 2 is an elevation of the inboard end of the brake assembly shown in FIG. 1.

DETAILED DESCRIPTION

Figure 1:
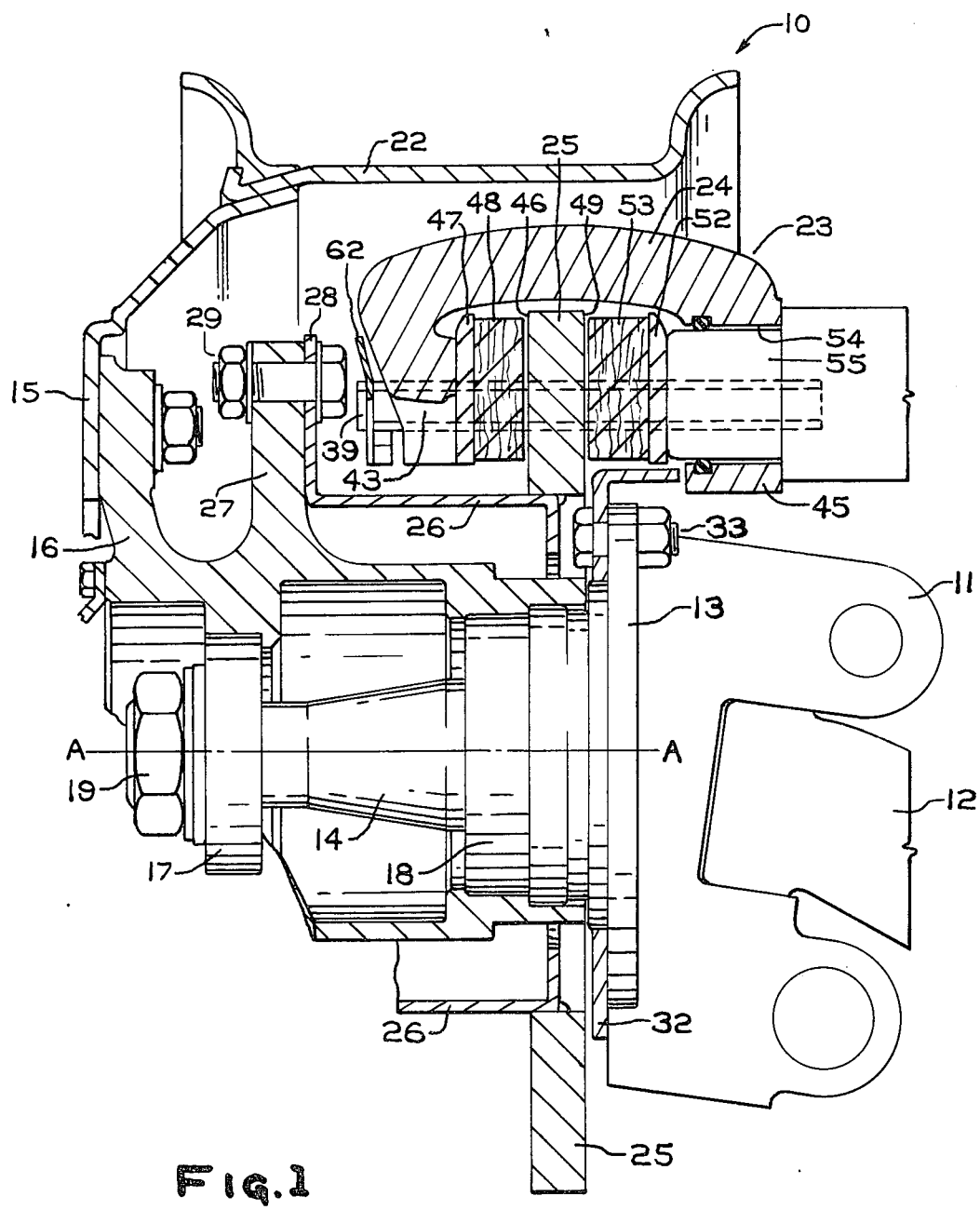
FIG. 1 is a fragmentary side elevation with the caliper disc brake and wheel assembly in section mounted on a front axle of a vehicle taken along the plane of line 1—1 in FIG. 2 and with the brake only rotated 45° clockwise.
Figure 2:
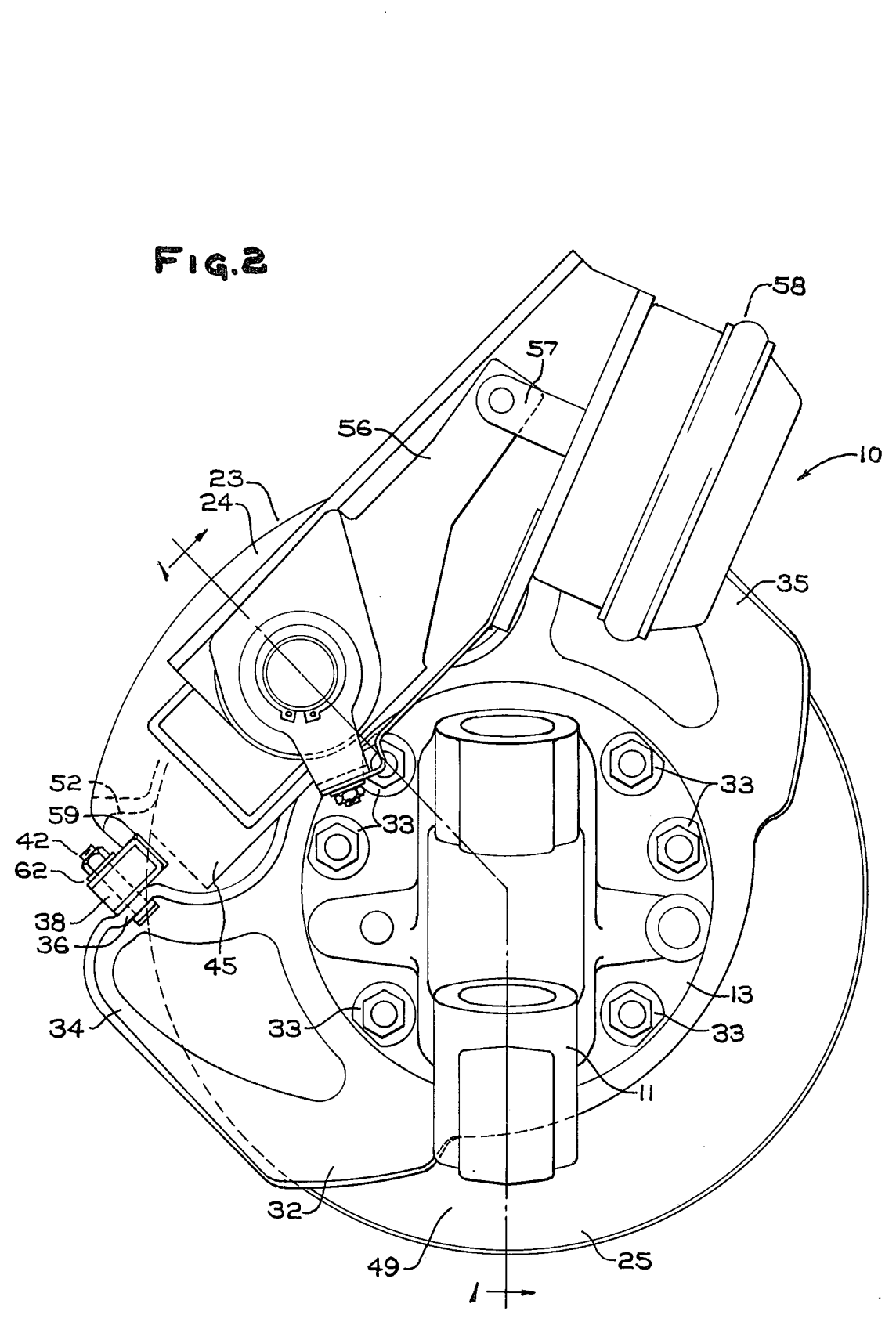

Referring to FIGS. 1 and 2, a wheel and axle assembly 10 for a front end of a vehicle is shown. A clevis bracket 11 is pivotally mounted on a front axle 12 and fastened to a circular plate 13 which is integral with a stub shaft 14 having an axis A—A. A wheel 15 having a hub 16 is rotatably mounted on the stub shaft 14 through suitable bearings 17 and 18 and retained on the stub shaft by a nut 19 threaded on the end of the shaft. The wheel 15 may have a rim 22 for supporting a tire (not shown).

A caliper brake 23 is mounted in the wheel well envelope within the wheel 15 and includes a caliper member 24 extending axially of the stub shaft 14 over a brake disc 25 which is mounted as by welding on a cylindrical disc adapter 26. The hub 16 has a radially extending hub flange 27 to which an adapter flange 28 of the disc adapter 26 is fastened as by bolt and nut assemblies 29 positioned at circumferentially spaced-apart locations around the hub flange and adapter flange. A torque flange 32 is bolted to the circular plate 13 by bolt and nut assemblies 33 at circumferentially spaced-apart positions around the plate. The torque flange 32 has arms 34 and 35 extending radially outward from the plate 13 with supporting member 36 on arm 34 and a supporting member 37 (not shown) on arm 35 for carrying rail members 38 and 39 which are bolted to the supporting members by nut and bolt assemblies 42.

At the outboard end of the caliper member 24, a radially extending member having a rear leg 43 extends radially inward in overlapping relationship with the brake disc 25. At the inboard end of the caliper member 24, a radially extending member such as front leg 45 extends radially inward in overlapping relationship with the brake disc 25. Interposed between an outboard face 46 of the disc 25 and the rear leg 43 is a friction lining carrier 47 carrying a friction lining 48 for engagement with the outboard face of the disc. Interposed between an inboard face 49 of the disc 25 and the front leg 45 is a friction lining carrier 52 carrying a friction lining 53 for engagement with the inboard face of the disc.

The front leg 45 of the caliper member 24 includes a cylindrical opening 54 in which a brake actuating mechanism 55 may be mounted. The mechanism 55 may include an actuating screw and threaded sleeve connected to a shaft with an arm 56 pivotally connected to a piston rod 57 of a pneumatic piston and cylinder assembly 58 as shown in FIG. 2.

The front leg 45 and rear leg 43 of the caliper member 24 have axially extending grooves 59 at the sides for sliding engagement with the rail members 38 and 39 of a U-shaped slider support member 62. Likewise, the friction lining carriers 47 and 52 have axially extending grooves at the edges for sliding engagement on the rail members 38 and 39. Accordingly, upon actuation of the brake by movement of the arm 56 in a counterclockwise direction as shown in FIG. 2, the friction lining carrier 52 and friction lining 53 are moved to the left as shown in FIG. 1 into braking engagement with the inboard face 49 of the disc 25.

At the same time the force exerted on the front leg 45 is transmitted through the beam of the caliper member 24 to the rear leg 43. The force from the rear leg 43 is transmitted to the lining carrier 47 urging the friction lining 48 into engagement with the outboard face 46 of the disc 25. This movement of the caliper member 24 is to the right as shown in FIG. 1 away from the hub flange 27. In a similar manner, the caliper member 24 moves away from the hub flange 27 as the friction linings 48 and 53 wear and adjustment is made for this wear.

Figure 4:
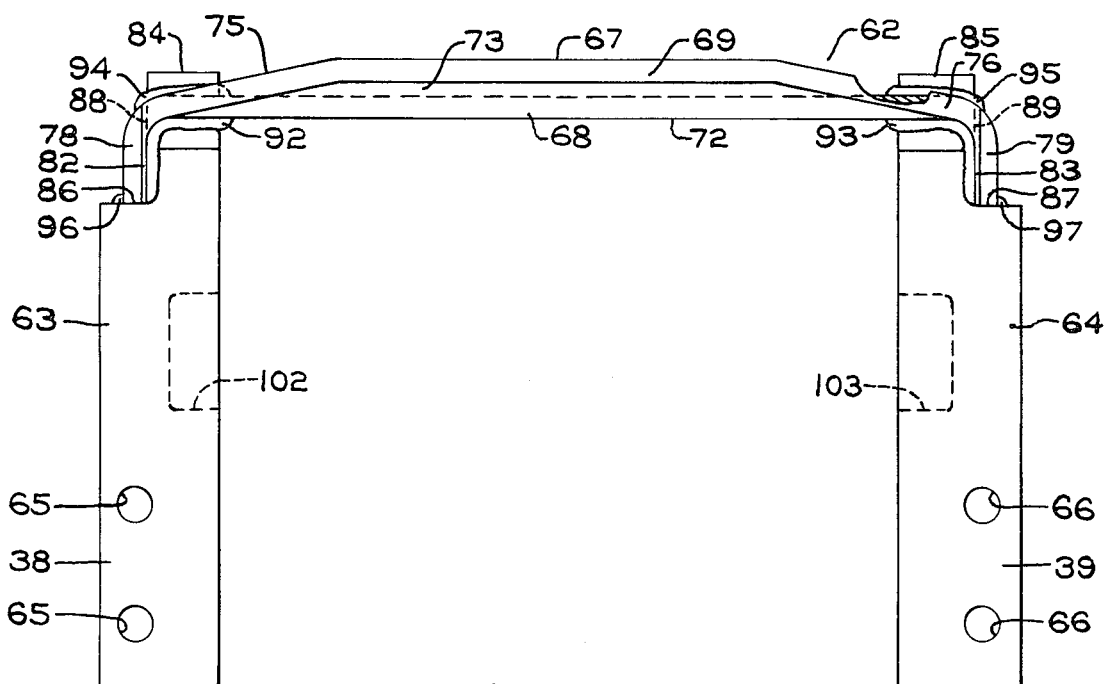
FIG. 4 is a plan view of the slider support taken along the plane of line 4—4 in FIG. 3.
Figure 3:
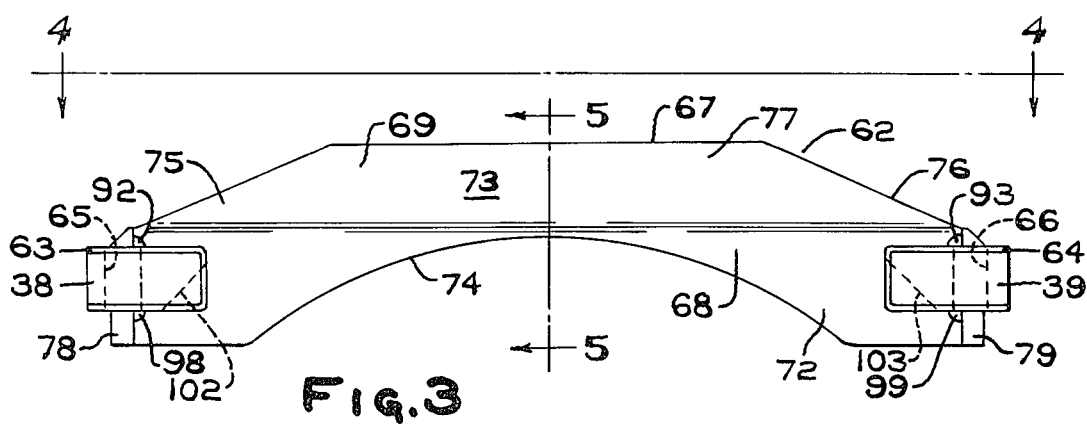
FIG. 3 is an enlarged elevation like FIG. 2 of the slider support embodying the invention.
Figure 5:
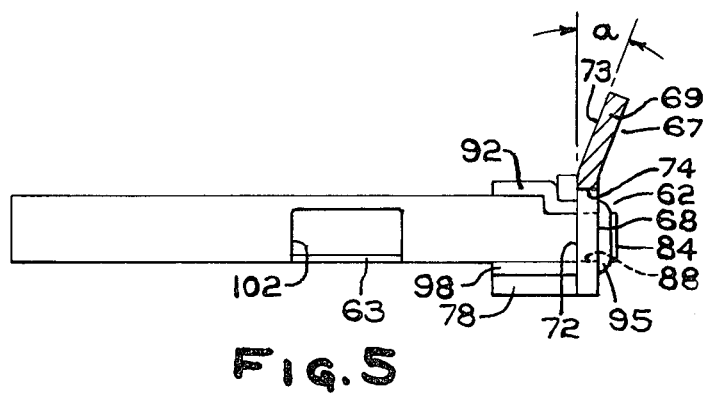
FIG. 5 is a sectional view taken along the plane of line 5—5 in FIG. 3.

Referring now to FIGS. 3, 4 and 5, the U-shaped slider support member 62 is shown in greater detail. The rail members 38 and 39 are substantially parallel and extend longitudinally (axially of the stub shaft 14) of the caliper brake 23. These rail members 38 and 39 may be bars of steel and covered at the surfaces engaged by the transversely extending caliper member 24 and friction lining carriers 47 and 52 with protective sheets 63 and 64 of wear-resistant steel or other wear-resisting vmaterial. The rail members 38 and 39 may also be of a lighter material which has the necessary strength but may not have the wear-resisting properties of steel. Bolt holes 65 and 66 may be provided in the rail members 38 and 39, respectively, to receive the nut and bolt assemblies 42 for clamping the rail members to the supporting members 36 and 37 of the torque flange 32.

The rail members 38 and 39 are connected by a tie bar 67 including a transversely extending plate member 68 of sheet material such as sheet steel having a thickness of around ¼ inch and stamped with a transversely extending reinforcing flange 69 at one edge of the plate member. The plate member 68 has a transversely extending first surface 72 and the reinforcing flange 69 has a transversely extending second surface 73 which is tilted away from the first surface of the plate member at an angle (a), shown in FIG. 5, which may be around 20° or an angle approximating the angle of the rear leg 43 of the caliper member 24 as shown in FIG. 1. As shown in FIGS. 4 and 5, the rail members 38 and 39 are generally perpendicular to the surface 72 of the plate member 68 for positioning of the plate member close to the rear leg 43. The reinforcing flange 69 may be a stamped part of the plate member 68 bent at the angle (a) or may be a separate piece welded to the plate member 68 at the angle (a).

In order to provide the necessary clearance for other brake parts, a recess 74 is provided in the plate member 68. Also the reinforcing flange 69 has tapered ends 75 and 76 with a wide central portion 77. The plate member 68 has end flanges 78 and 79 extending generally perpendicular to the first surface 72 and abutting surfaces 82 and 83 of end portions 84 and 85 of the rail members 38 and 39. These end portions 84 and 85 may have a reduced width so that the end flanges 78 and 79 will abut edges 86 and 87 of the rail members 38 and 39.

The end portions 84 and 85 of the rail members 38 and 39 also may extend through openings 88 and 89 in the plate member 68. The end portions 84 and 85 of the rail members 38 and 39 are then fastened to the end flanges 78 and 79 of the plate member 68 by welding at welds 92 through 98 as shown in FIGS. 3 through 5. The end flanges 78 and 79 as shown in the drawings are parts of the plate member 68 which have been bent in the configuration shown; however, the end flanges may be separate parts which are fastened to the plate member 68 if so desired. As shown in the drawings, slots 102 and 103 are provided in the rail members 38 and 39 to provide clearance for the brake disc 25.

To replace the friction lining carriers 47 and 52, the wheel 15 is removed from the hub 16. Then by removing the nut and bolt assemblies 42 the rail members 38 and 39 may be lifted off the supporting members 36 and 37 and moved radially away from the brake disc 25 along with the caliper member 24 and lining carriers 47 and 52. The caliper member 24 and lining carriers 47 and 52 may then be slipped off the inboard ends of the rail members 38 and 39 after which substitute lining carriers 47 and 52 may be installed. The caliper member 24, slider support member 62 and lining carriers 47 and 52 may then be set down over the disc 25 and on the supporting members 36 and 37 for fastening to the rail members 38 and 39 by the bolt and nut assemblies 42 attached to the supporting members.

With this construction, the tie bar 67 connects the rail members 38 and 39 for distributing torque forces from the lining carriers 47 and 52 between the arms 34 and 35 of the torque plate 32. As shown in FIG. 1, the tie bar 67 of the slider support member 62 has the configuration wherein it may be positioned in the space between the rear leg 43 of the caliper member 24 and the bolt and nut assemblies 29 fastening the adapter flange 28 to the hub flange 27 while at the same time providing the necessary strength and structural properties required. In this way, substantial caliper wheel well penetration is obtained and a substantial radius of the disc 25 is possible for a given wheel envelope size. The tie bar 67 also provides a force damping effect for each of the rail members 38 and 39.

The invention is capable of other modifications and adaptions by those having ordinary skill in the art and is more particularly defined by the appended claims.

I claim:

1. A U-shaped slider support member for a caliper brake comprising spaced-apart, parallel, longitudinally extending rail members for sliding engagement with a transversely extending caliper member and transversely extending friction lining carriers, a separate tie bar connecting said rail members, said tie bar including a transversely extending plate member with a transversely extending first surface, the ends of said plate member having end flanges, said end flanges and said rail members extending generally perpendicular to said first surface in side-by-side relationship and each of said end flanges being fastened to one of said rail members.

2. A slider support member according to claim 1 wherein said tie bar has a transversely extending reinforcing flange with a transversely extending second surface, said reinforcing flange being tilted away from said caliper member with respect to said plate member so that said second surface is tilted with respect to said first surface.

3. A slider support member according to claim 2 wherein said second surface is tilted with respect to said first surface at an angle of around 20°.

4. A slider support member according to claim 2 wherein said plate member has a recess at one side between said end flanges and said reinforcing flange has a wide central portion and tapered end portions.

5. A slider support member according to claim 1 wherein said plate member has openings adjacent said end flanges for insertion of one end of each of said rail members.

6. A slider support member according to claim 1 wherein each of said rail members has a cover member of wear-resistant sheet material extending over at least the surfaces in sliding engagement with said caliper member and said friction lining carriers.

* * * * *